United States Patent [19]

Brantley et al.

[11] 4,006,999

[45] Feb. 8, 1977

[54] LEADING EDGE PROTECTION FOR COMPOSITE BLADES

[75] Inventors: James W. Brantley, Cincinnati; Thomas P. Irwin, Fairfield, both of Ohio

[73] Assignee: The United States of America as represented by the Administrator of the National Aeronautics and Space Administration, Washington, D.C.

[22] Filed: July 17, 1975

[21] Appl. No.: 596,905

[52] U.S. Cl. .............................. 416/224; 416/230
[51] Int. Cl.² ........................................ F01D 5/28
[58] Field of Search ............... 416/224, 229 A, 230

[56] References Cited

UNITED STATES PATENTS

| | | | |
|---|---|---|---|
| 1,674,674 | 6/1928 | Wooster | 416/224 |
| 2,644,296 | 7/1953 | Sanz et al. | 416/229 X |
| 3,294,366 | 12/1966 | Coplin | 416/224 X |
| 3,600,103 | 8/1971 | Gray et al. | 416/224 |
| 3,701,190 | 10/1972 | Stone | 29/156.8 |
| 3,758,234 | 9/1973 | Goodwin | 416/230 |
| 3,762,835 | 10/1973 | Carlson et al. | 416/224 |
| 3,883,267 | 5/1975 | Baudier et al. | 416/230 |

FOREIGN PATENTS OR APPLICATIONS

| | | | |
|---|---|---|---|
| 523,788 | 8/1921 | France | 416/224 |
| 687,663 | 2/1940 | Germany | 416/224 |
| 2,062,053 | 6/1971 | Germany | 416/224 |
| 550,341 | 1/1943 | United Kingdom | 416/224 |

*Primary Examiner*—Everette A. Powell, Jr.
*Attorney, Agent, or Firm*—Robert C. Lampe, Jr.; Norman T. Musial; John R. Manning

[57] ABSTRACT

A laminated filament composite structure, such as an airfoil for use in an environment in which it is subjected to both foreign object impact and bending is provided with improved leading edge protection. At least one fine wire mesh layer is partially bonded within the composite structure along its neutral bending axis. A portion of the wire mesh layer extends beyond the neutral bending axis and partially around the leading edge where it is bonded to the outer periphery of the primary composite structure. The wire mesh is clad with a metal such as nickel to provide an improved leading edge protective device which is firmly anchored within the composite structure. The neutral bending axis anchoring tends to retain the leading edge protective device intact even after the delamination of the composite structure. Also described is a novel method of constructing a composite airfoil so as to further minimize the possibility of losing the leading edge protective device due to delamination caused by impact and bending.

15 Claims, 9 Drawing Figures

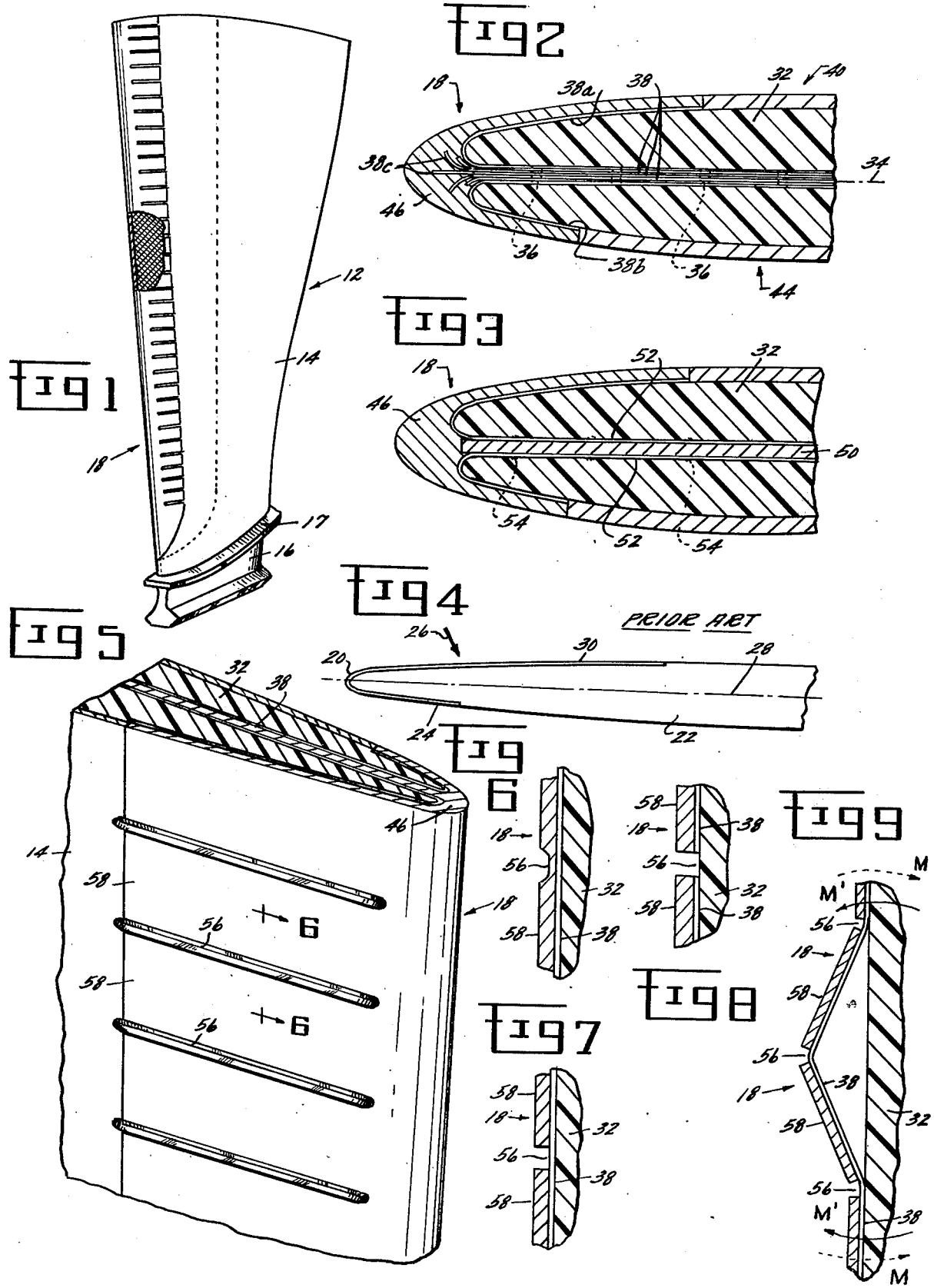

LEADING EDGE PROTECTION FOR COMPOSITE BLADES

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to composite blades for use in gas turbine engines and, more particularly, to improved leading edge foreign object damage protection for use therein.

For many years attempts have been made to replace the relatively heavy, homogeneous metal blades and vanes of gas turbine engine compressors with lighter composite materials. The primary effort in this direction has been toward the use of high strength, elongated filaments composited in a lightweight matrix. Early work involved glass fibers and more recent efforts have been directed toward the utilization of boron, graphite and other synthetic filaments. These later materials have extremely high strength characteristics as well as high moduli of elasticity which contribute to the necessary stiffness of the compressor blades and vanes.

Many problems have confronted the efforts to utilize these filaments, particularly in adapting their unidirectional strength characteristics to a multidirectional stress field. To a large extent, these problems have been overcome and composite blades have been demonstrated with performance characteristics, in many areas, equal to or better than their homogeneous metal counterparts in addition to providing the expected and significant weight reductions.

However, composite blades have not yet been introduced into operational service due, to a large extent, to their vulnerability to what is referred to as foreign object damage (FOD). Many types of foreign objects may be entrained in the inlet of an aircraft gas turbine engine ranging from large birds, such as seagulls, to hailstones, sand and rain. Damage from foreign objects takes two forms. Smaller objects can erode the blade material and degrade the performance of the compressor. Impact by larger objects may rupture or pierce the blades. Portions of an impacted blade can be torn loose and cause extensive secondary damage to downstream blades and other engine components.

In this regard, the consequences of foreign object damage are greatest in the low pressure compressors, or fans, of high bypass gas turbine engines. However, these components offer the greatest potential in weight reduction due to their large tip diameters, as great as eight feet, and spans in the order of three or more feet.

The vulnerability of composite blades to foreign object damage is due to two factors. First, the lightweight matrix material employed, generally polymeric resins or metals such as aluminum, is relatively soft. Second, the high strength filaments are relatively hard and brittle.

From this it would seem evident that a protection system involving a hard surface coating should be provided for these composite blades and vanes. This is even more evident from the early recognition in the aviation industry that such protective systems were desirable for wooden propeller blades and propeller blades formed of early composite materials such as cloth fabric in a phenolic resin matrix. Many such systems have been proposed. They include claddings of various compositions applied to the leading edge portion or the entire surface of a propeller.

One particularly promising system for protecting the leading edge of composite blades and vanes is disclosed and claimed in U.S. Pat. No. 3,762,835, "Foreign Object Damage Protection for Compressor Blades and Other Structures and Related Methods," Carlson et al, which is assigned to the same assignee as the present invention and the disclosure of which is incorporated herein be reference. Therein, a filament composite compressor blade is provided with a fine wire mesh subsurface layer wrapped around its leading edge. This subsurface layer is clad with nickel and provides a protection against impact damage by large and small foreign objects such as stones and sand. Where the subsurface mesh layer is bonded in place by a non-conductive adhesive, the adhesive in the interstices of the mesh is coated with silver and the nickel is atomically bonded to the nubs of the mesh forming a metallic strip.

However, it has been found that in some instances where the leading edge FOD protection comprises such a metallic strip wrapped about the fan blade leading edge, this protection may be lost during impact by medium-sized birds due to partial delamination of the blades. This, in turn, can result in secondary engine damage as the FOD protection strip is ingested through the engine. Additionally, engine imbalance at high speeds can cause further damage.

Observation of high speed films taken of a rotating laminated composite fan blade during such an impact reveals that, sequentially, the FOD protection strip is broken at the location of impact; severe bending of the leading edge normal to the blade chord occurs; and, the entire leading edge FOD strip is lost after impact is completed due to delamination within the first few filament laminars (or plies) beneath the FOD strip. The outermost filament laminars separate from the remainder of the blade carrying with them the leading edge FOD strip since these filament laminars, by themselves, cannot carry the (now delaminated) leading edge and fracture near the root of the blade. Hence, the entire leading edge FOD strip is lost.

SUMMARY OF THE INVENTION

Accordingly, it is the primary object of this invention to provide filament composite blades for gas turbine engines which incorporate an improved leading edge foreign object protection device, such device being capable of withstanding severe impact loads without delaminating from the blade.

It is a further object of the present invention to provide a novel method of orienting the composite filament laminars such as to minimize loss of the leading edge foreign object protection device due to delamination.

It is yet another object of the present invention to localize any damage due to impact and thus prevent loss of the entire leading edge protective device.

These and other objects and advantages will be more clearly understood from the following detailed description, the drawings and specific examples, all of which are intended to be typical of rather than in any way limiting to the scope of the present invention.

Briefly stated, the above objectives are accomplished in a blade formed of elongated, small diameter filaments, having high strength and high modulus of elasticity, which are composited into a lightweight matrix and which form the primary composite structure of the blade. At least one fine wire mesh layer is partially anchored within, and bonded to, the composite structure along the blade neutral bending axis. A portion of the wire mesh layer extends beyond the neutral bending axis and is partially wrapped around the leading edge of the blade whereupon it is bonded in the known manner to the outer periphery of the primary composite structure. The wire mesh is clad with a metal, again in a known manner, to provide an improved leading edge protective device which is firmly anchored within the composite structure. The neutral bending axis anchoring tends to retain the device intact even after delamination of the outer laminates of the composite structure.

In one embodiment, a plurality of fine wire mesh layers are anchored along the blade neutral axis, at least one of which extends beyond the neutral axis to be anchored also within the hard metal cladding. In yet another embodiment, a metallic anchor is disposed within the blade primary composite structure substantially along the neutral bending axis with the wire mesh affixed to the anchor.

In accordance with one object of the present invention, the composite filament laminars proximate the blade neutral bending axis are oriented substantially radially in order to carry the centrifugal (radial) loads while experiencing minimum strain under the severe bending conditions created by impact. The filament laminars at the outer surface of the primary structure, and beneath the metal cladding are oriented in a direction other than radial to provide stiffness to the blade without being subjected to as severe a bending condition as would be experienced if the fibers were oriented radially.

In yet another embodiment a leading edge metal cladding is scored in the chordwise direction to induce local crippling under severe bending conditions and to thereby further minimize separation.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a perspective view of a gas turbine engine compressor blade embodying the present invention;

FIG. 2 is a partial sectional view, on an enlarged scale, depicting in greater detail the leading edge protective device of the blade of FIG. 1;

FIG. 3 is a partial sectional view, similar to FIG. 2, showing an alternate form of the leading edge protective device;

FIG. 4 is a sectional view, similar to FIG. 2, showing a prior art leading edge protective device;

FIG. 5 is an enlarged perspective view of a portion of the leading edge of the blade of FIG. 1;

FIG. 6 is a partial sectional view, taken along line 6-6 of FIG. 5, depicting chordwise scoring of the blade leading edge protective device;

FIG. 7 is a partial sectional view, similar to FIG. 6, depicting an alternative form of leading edge scoring;

FIG. 8 is a partial sectional view, similar to FIG. 6, depicting yet another alternative form of the leading edge scoring; and FIG. 9 is a schematic representation of one mechanism for preventing blade leading edge delamination.

DESCRIPTION OF THE PREFERRED EMBODIMENT

Referring to the drawings wherein like numerals correspond to like elements throughout, attention is first directed to FIG. 1 wherein a composite rotor blade 12 constructed according to the present invention is illustrated. While not so limiting, blade 12 is adapted for use in an axial flow gas turbine compressor or fan. It will become apparent to those skilled in the art that the present invention offers an improvement for many structures subject to both foreign object impact and bending, and the rotor blade 12 is merely meant to be illustrative of one such application. Accordingly, rotor blade 12 is shown to comprise an airfoil portion 14 having radially variant camber and stagger, a dovetail tang 16 which enables the blade to be mounted on a rotatable disc in a conventional manner, and a flow path defining platform 17 therebetween.

The major portion, or primary structure, of this blade comprises elongated, small diameter filaments having high strength and high modulus of elasticity embedded in a lightweight matrix. In one embodiment involving predominantly non-metallic materials, the primary structure would comprise graphite filament laminates in an epoxy resin. However, it is understood that the present invention anticipates the use of any fiber embedded in any binder such as an organic resin for its primary structure. Further, it is anticipated that the structure could comprise any metallic system, including boron filaments in an aluminum matrix. Such a primary structure is taught and claimed in the aforementioned patent to Carlson et al.

Referring now to FIGS. 1 and 2, it is observed that a foreign object damage protection device 18 has been added to the leading edge of blade 12 to provide protection for the filament composite structure. The protection device extends from the tip of the blade to the hub, stopping short of platform 17. If the blade were not provided with a platform, the protection device would extend from the tip to just short of the dovetail tang 16. In other words, the protection device sheaths that portion of the airfoil extending into a motive fluid flow path that would be subject to impact by foreign particles entrained in the motive fluid.

FIG. 4 depicts the leading edge protection device for a prior art blade wherein a metal cladding 20 is wrapped around the leading edge of the filament composite primary structure 22 and bonded thereto by any of a number of well-known techniques. As has been discussed previously, it has been found that, in some instances, leading edge protective devices typical of FIG. 4 have been damaged during impact by foreign objects to the extent that the device delaminates from the blade entirely.

Consider, for example, the blade of FIG. 4 being impacted upon the blade pressure surface 30 by a foreign particles traveling along a path represented by vector 26. Upon impact, the blade will bend in the circumferential direction about its neutral bending axis 28. (As used herein, the neutral bending axis is defined as the locus of points defining a plane of the blade which will experience zero fiber stress under bending.)

Severe bending would cause the relatively ductile metal cladding 20 to yield and the brittle graphite fibers near the pressure surface 30 to fracture in tension, thus setting up a condition favoring delamination. Upon reverse bending, or return to the initial "straight" condition, the yielded metal cladding must either be compressed back to its initial length or deflect to some other stable position. Since the effective length of the metal cladding 20 which is wrapped about the suction surface (and which serves as a flange to increase stiffness) is small, and since partial delamination of the pressure surface has occurred, the metal cladding is unsupported on the pressure surface. Buckling and further delamination at or near the suction surface 24 upon reverse bending then results in complete separation of the metal cladding from the leading edge of the blade. Centrifugal loading completes the detachment of the metal cladding by fracture of the few remaining fibers at the blade root.

In the improved leading edge protective device 18 of FIG. 2, a plurality of layers of fine wire mesh 38 are partially embedded within the matrix material of the primary structure 32 along the blade neutral axis 34. In many advanced blades where the leading edge is relatively straight (without camber) the blade neutral axis will approximate the blade mean line, assuming a "pseudo-isotropic" build-up of the fiber laminates. Where the build-up is orthotropic, the neutral axis may deviate from the blade mean line but is determinable by known methods.

The purpose of embedding the wire mesh into the primary structure is to provide an anchor for the leading edge protective metal cladding which will not separate or delaminate from its adjacent filament laminates since, by definition, they will experience zero stress due to bending. These several layers of wire mesh 38 are tack-welded or brazed together as at 36 to prevent movement therebetween, the number of wire mesh layers dependent on the size and strength anchor required.

The free end of one such wire mesh layer 38a is wrapped around the leading edge and is bonded to the blade suction surface 44 in the known manner as taught by Carlson et al. A second wire mesh layer 38b is wrapped back upon the pressure surface 40 whereupon it is also bonded in the known manner. A hard metal cladding 46 is then atomically bonded to the wire mesh, again in a manner taught by Carlson et al. In the event that additional anchoring is required, one or more of the remaining free ends 38c of the wire mesh layers may be anchored within the metal cladding 46 during the cladding build-up process. Thus, in accordance with the primary object of the present invention, an improved method of anchoring a leading edge protective device on a filament composite blade has been provided. Such an improved leading edge protection device anchored at the neutral axis will remain intact and retained with the blade even after delamination of the near surface filament laminates.

FIG. 3 depicts an alternative embodiment of affixing a protective device to a blade. Therein, a metal anchor 50 is embedded within the primary structure 32 along the neutral axis. Wire mesh layers 52 are tack-welded, brazed or otherwise attached to the anchor 50 as at 54. In all other aspects this embodiment is similar to that of FIG. 2, with the metal cladding 46 being bonded to the wire mesh in the known manner.

Additional benefits may be derived by orienting the filament laminates in specific directions during build-up of the primary structure. For example, orientation of the filaments at the outer surface of the primary structure, and just under the metal cladding, in a direction other than radial will eliminate the tensile fracture of the fibers and avoid the tendency to delaminate as a result of severe bending. These "bias" plies near the blade surface will provide stiffness to the blade leading edge without subjecting the plies to as severe a bending condition as they would experience if they were oriented radially. However, this arrangement compromises the radial load-carrying capability. This is compensated for by placing radial filaments at or near the neutral axis where they can still carry the centrifugal loading but where they will be strained less under the severe bending condition of impact.

Additional shear strength may be achieved in the primary structure by fraying the filaments of each laminate like the head of a mop prior to and during the build-up. This will tend to decrease the orthotropic nature of each laminate and, as a result, its stress capability and stiffness. However, intermingling of the filaments enhances the shear capability. Larger deflections will be possible as a result of the slight decrease in stiffness, thus lengthening the duration of impact and thereby reducing peak impact loading. Furthermore, by partial random orientation of the individual filaments, all filaments will not be stressed to fracture simultaneously during impact and bending. Additional benefit may be obtained by applying chopped composite filament-impregnated resin slurry between the filament laminates, thus mechanically interlocking adjacent laminates with randomly oriented chopped fibers and further improving the shear capability.

In accordance with another object of the present invention, means are provided to localize any damage due to foreign object impact and thus prevent loss of the entire leading edge protective device. FIG. 5 represents an enlarged perspective view of a portion of the leading edge of the blade of FIG. 1 embodying the improved anchoring. As discussed hereinabove, one of the causes of complete loss of the protective metal cladding 46 is the buckling of the metal cladding when, in a yielded condition, a compressive action tries to force it back to its initial length. A solution to this problem is to score the metal cladding in a chordwise direction as depicted in FIG. 5 to induce local buckling. As shown in FIGS. 6 through 8, the scoring (or serrations 56) may extend partially through the metal cladding 46 (FIG. 6), totally through the metal cladding (FIG. 7), or through both the cladding and wire mesh 38 (FIG. 8). The object is to induce local crippling of the protective device under severe bending action and reduce the load required to locally buckle a yielded leading edge, thus reducing the tendency to delaminate.

Consider FIG. 9 wherein the leading edge protection device 18 has been scored into a plurality of platelets 58. Assume also that under bending loads represented by phantom bending moments M, platelets 58' have been delaminated from the primary structure 32, the extent of delamination being limited by scoring 56. Under reverse bending represented by moments M', the platelets 58' will create a force upon adjacent platelets 58 normal to the blade surface which will further reduce the tendency of the leading edge protective device to delaminate. Thus, scoring of the leading edge tends to prevent loss of the entire leading edge protective device.

It should be obvious to one skilled in the art that certain changes can be made to the above-described invention without departing from the broad inventive concepts thereof. For example, though the preferred embodiment has been directed toward rotating compressor blades, the present invention is equally applicable to any static or rotating structure subject to foreign object impact and bending, including helicopter blades.

Having thus described the invention, what is considered novel and desired to be secured by Letters Patent of the United States is:

1. A turbomachinery blade comprising:
   a primary structure including small diameter, high strength filaments composited in a lightweight matrix; and
   a leading edge protective device partially surrounding said primary structure, a portion of which is anchored within said primary structure along a neutral bending axis thereof, wherein the filaments adjacent the anchored portion are aligned substantially radially within said primary structure.

2. The improved blade of claim 1 wherein the edge protective device comprises:
   at least one closely woven, small diameter wire mesh layer bonded to said primary structure by a bonding agent filling the interstices of the wire mesh;
   a hard metal cladding bonded to the wire mesh; and
   wherein at least a portion of the wire mesh is anchored within the primary structure substantially along the neutral bending axis thereof.

3. The improved blade of claim 2 wherein a plurality of wire mesh layers are anchored partially within the primary structure and substantially along the neutral bending axis, said one layer extending beyond the neutral axis and bonded to the outer periphery of said primary structure.

4. The improved blade of claim 3 wherein at least one other wire mesh layer extends beyond the neutral bending axis and is anchored within said hard metal cladding.

5. The improved blade of claim 3 wherein said wire mesh layers are metallically bonded together at the neutral bending axis.

6. The improved blade of claim 2 wherein a metallic anchor is disposed within the primary structure substantially along the neutral bending axis and said one layer is affixed to said anchor.

7. The improved blade of claim 2 wherein the filaments adjacent the metal cladding are oriented in a direction other than radial.

8. The improved blade of claim 1 wherein at least a portion of the filaments are frayed prior to lamination with the matrix material.

9. The improved blade of claim 1 wherein the matrix material comprises filament impregnated resin slurry.

10. The improved blade of claim 2 wherein the metal cladding is scored in the chordwise direction to induce local crippling under severe bending conditions.

11. The improved blade of claim 10 wherein the scoring extends through the metal cladding.

12. The improved blade of claim 11 wherein the scoring also extends through the wire mesh layer.

13. The improved blade of claim 1 wherein the primary structure comprises boron filaments in an aluminum matrix.

14. The improved blade of claim 1 wherein the primary structure comprises graphite filaments in an organic epoxy matrix.

15. A turbomachinery blade comprising:
   a primary structure formed of small diameter, high strength filaments composited in a lightweight matrix; and
   a leading edge protective device including a small diameter wire mesh layer bonded to said primary structure by a bonding agent filling the interstices of the wire mesh, and a hard metal cladding bonded to the wire mesh, wherein the metal cladding is scored in the generally chordwise direction.

* * * * *